US012643240B2

(12) United States Patent
Sandri et al.

(10) Patent No.: US 12,643,240 B2
(45) Date of Patent: Jun. 2, 2026

(54) ROBOTIZED UNIT AND METHOD FOR CONTROLLING A METAL PRODUCT IN MOVEMENT IN AN APPARATUS, AND METHOD TO PRODUCE METAL REELS

(71) Applicants: DANIELI & C. OFFICINE MECCANICHE S.P.A., Buttrio (IT); DANIELI AUTOMATION S.P.A., Buttrio (IT)

(72) Inventors: Matteo Sandri, Tavagnacco (IT); Enrico Piceni, Montichiari (IT); Loris Busolini, Cividale del Friuli (IT); Claudio Tomat, Premariacco (IT)

(73) Assignees: DANIELI & C. OFFICINE MECCANICHE S.P.A., Buttrio (IT); DANIELI AUTOMATION S.P.A., Buttrio (IT)

( * ) Notice: Subject to any disclaimer, the term of this patent is extended or adjusted under 35 U.S.C. 154(b) by 79 days.

(21) Appl. No.: 18/715,277

(22) PCT Filed: Dec. 2, 2022

(86) PCT No.: PCT/IT2022/050312
§ 371 (c)(1),
(2) Date: May 31, 2024

(87) PCT Pub. No.: WO2023/100211
PCT Pub. Date: Jun. 8, 2023

(65) Prior Publication Data
US 2025/0042039 A1 Feb. 6, 2025

(30) Foreign Application Priority Data
Dec. 2, 2021 (IT) ........................ 102021000030503

(51) Int. Cl.
*B25J 11/00* (2006.01)
*B25J 9/16* (2006.01)
(Continued)

(52) U.S. Cl.
CPC ........... *B25J 11/005* (2013.01); *B25J 9/1697* (2013.01); *B25J 15/0066* (2013.01); *B25J 19/023* (2013.01)

(58) Field of Classification Search
CPC .... B25J 11/005; B25J 9/1697; B25J 15/0066; B25J 19/023; B25J 9/161; B25J 9/163; B25J 13/08; B21C 47/262; B21C 47/143
See application file for complete search history.

(56) References Cited

U.S. PATENT DOCUMENTS 3,756,289 A 9/1973 Rotert
4,995,251 A 2/1991 Reumann
(Continued)

FOREIGN PATENT DOCUMENTS

CN 114166846 A * 3/2022 ......... G01N 35/0099
JP H0798217 4/1995
(Continued)

OTHER PUBLICATIONS

CN114166846A machine translation.*
(Continued)

*Primary Examiner* — Robert T Nguyen
(74) *Attorney, Agent, or Firm* — RANKIN, HILL & CLARK LLP

(57) ABSTRACT
A robotized unit for controlling a metal product in motion driven in an automated manner, in accordance with a corresponding computerized method, in order to manipulate or cut a portion of the metal product includes an apparatus and method to produce metal reels.

12 Claims, 3 Drawing Sheets

(51) Int. Cl.
    *B25J 15/00*         (2006.01)
    *B25J 19/02*         (2006.01)

(56)                References Cited

U.S. PATENT DOCUMENTS

| | | | |
|---|---|---|---|
| 11,618,069 B2 * | 4/2023 | Teegavarapu | G01N 33/20 |
| | | | 83/79 |
| 2019/0291168 A1 * | 9/2019 | Teegavarapu | B25J 11/0055 |
| 2020/0166909 A1 * | 5/2020 | Noone | G06N 20/00 |
| 2025/0042039 A1 * | 2/2025 | Sandri | B25J 11/005 |

FOREIGN PATENT DOCUMENTS

| | | | | |
|---|---|---|---|---|
| KR | 20190032908 | | 3/2019 | |
| KR | 20250021832 A | * | 2/2025 | G06N 3/08 |
| WO | 2017/082908 | | 5/2017 | |

OTHER PUBLICATIONS

KR20250021832A machine translation.*

Blug A et al, "On the potential of current CNN cameras for industrial surface inspection", Cellular Nanoscale Networks and Their Applications (CNNA), 2012 13thInternational Workshop On, IEEE,Aug. 29, 2012 (Aug. 29, 2012), p. 1-6.

International Search Report filed in PCT/IT2022/050312 mailed Apr. 13, 2023.

* cited by examiner

ROBOTIZED UNIT AND METHOD FOR CONTROLLING A METAL PRODUCT IN MOVEMENT IN AN APPARATUS, AND METHOD TO PRODUCE METAL REELS

FIELD OF THE INVENTION

The present invention concerns a robotized unit and the corresponding method for controlling a metal product in motion, specifically rod or wire, in an industrial process for the production of metal reels, in particular, but not only, starting from a hot rolling method. The robotized unit is configured to identify, control, manipulate and possibly remove portions of product that could generate problems or cobbles, or for simple sampling.

The present invention also concerns an apparatus which comprises said robotized unit and a corresponding method for the production of metal reels.

BACKGROUND OF THE INVENTION

Apparatuses are known for the production of metal reels in which a hot-rolled metal product, for example a smooth or ribbed rod or wire, is fed continuously or semi-continuously (for example with a "billet to billet" feed) to a winding unit in which a laying head, or coil forming head, forms a continuous series of coils and places them, in a staggered configuration lengthwise, on a continuous transport conveyor, generally a roller way, on which they are subjected to cooling.

The product thus disposed ends its run in a reel forming unit, and is dropped into a well in the center of which there is a trolley mounting a centering rod on which the coils are stacked one above the other to define the skein/spool.

It is known that the initial and/or final part of the product may not be formed correctly. Consequently, while the product advances on the roller way, it is necessary to check at least the condition of the last coil, or more generally of a last portion of product, to ensure that the automatic reel forming unit works without the risk of blocking along the continuous transport conveyor.

The blocking of the coils along the roller way or in the forming unit is one of the most widespread problems and is to be avoided, since it can cause malformation of the skeins, plant stoppages, damage to the structures, increase in maintenance interventions and, if operators are present, high risks of accidents as well.

In conventional rolling plants, the last portion of advancing product is controlled manually by one or more operators who supervise the terminal zone of the roller way where the product passes at a temperature of about 500° C. Manual cutting of the tail portion of the moving product can present difficulties dictated by the high relative speed of the roller way with respect to the operators, by the temperatures involved, by the weight of the portion of product to be removed from the roller way, especially in the case of sampling and quality control, by the diameter of the product and by other factors.

Automated systems have also been proposed for carrying out these operations to recognize, cut and remove the final portion of the product being worked. However, these systems are not able to distinguish with certainty the final portion of the product from the previous homogeneous part, and whether this final portion has defects or a position/conformation such as to cause subsequent problems during winding. Therefore, the final part is often removed and often the part removed is greater than what is actually necessary, this causing a reduced productivity of the plant and an increase in processing waste. Or the final part is not recognized and removed, with the consequent generation of cobbles or the production of non-standard reels.

WO 2017/082908 A1 concerns in general rolling mills that produce hot rolled products and in particular the trimming and removal of the head and tail ends of such products and the correct positioning of the new ends after trimming. WO'908 does not provide to identify the presence of a defect in the terminal portion, head or tail, of such products. Therefore WO'908 provides a system that does not allow to optimize the process given that, as expressed above, often the part of the product removed is greater than what is actually necessary.

Another example of a method and apparatus for cutting the head and tail ends of metal wire subsequently wound into a reel is described in U.S. Pat. Nos. 4,995,251 A and 3,756,289 A. US'251 and US'289 do not mention the detection of defects either, therefore they have the same disadvantages as WO'908.

KR 2019 0032908 A and the document BLUG A. ET AL: "On potential of current CNN cameras for industrial surface inspection" concern the detection of microscopic surface defects and not macroscopic shape defects or cobble defects in the production of metal products by using artificial intelligence.

JP H0798217 A concerns a device for identifying defects on a three-dimensional object that can be installed in a production line of said object.

Therefore, none of these documents allows to optimize the operation of the apparatuses and methods for the production of metal reels in the function of selective removal of the head or tail portion of the metal product being worked.

There is therefore a need to perfect a robotized unit and a method for controlling a metal product in motion and an apparatus and method for the production of metal reels, which can overcome at least one of the disadvantages of the state of the art.

One purpose of the present invention is to provide a robotized unit able to perform a quality control on the product being worked, in particular on at least one final portion thereof, thus reducing waste due to the incorrect identification of defects and therefore excessive removal of material.

Another purpose of the present invention is to provide a computerized method for managing the robotized unit, preferably according to a self-learning logic.

Another purpose of the present invention is to construct an apparatus for the production of metal reels having high productivity and a reduced number of plant stoppages compared to the apparatuses known in the state of the art.

Another purpose of the present invention is to provide a method for the production of metal reels which is particularly efficient and allows automated and on-the-fly control of the product being worked.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, a robotized unit for controlling a metal product in motion, preferably rod or hot-rolled wire, comprises at least one robotized articulated arm and an acquisition and control unit comprising a video monitoring system configured to acquire a sequence of frames of the metal product and a processing system configured to process said sequence of frames and transmit an actuation signal to the robotized articulated arm.

In accordance with one aspect of the present invention, the processing system implements an artificial intelligence configured at least to a) recognize a terminal portion of the metal product and b) identify whether the terminal portion has a macroscopic defect, for example a shape or cobble defect.

The processing system also allows to selectively manage movements of the robotized articulated arm, in a direction of feed of the metal product in substantially linear motion, on the basis of the defect identified (manipulation, repositioning or cutting with possible subsequent repositioning).

By doing so, it is possible, in an automated manner, to operate on the metal product being worked in a targeted manner, only in the specific case of presence of a defect in the tail portion, and in this case to act in a specific manner according to the type of defect. In this way, the robotized unit, the apparatus on which it is mounted, and the corresponding methods are optimized with reduced product waste during working and an increase in the quality of the final products.

In accordance with another aspect of the present invention, the robotized articulated arm can preferably be moved in at least six degrees of freedom, preferably in seven degrees of freedom. This allows to operate on the metal product, in particular but not exclusively on the terminal portion, independently of its position, geometry or conformation.

In accordance with another aspect of the present invention, the video monitoring system comprises at least one video camera positioned on a fixed support or on board the robotized articulated arm, on a manipulation head of said arm. In this way, it is possible to frame the product on-the-fly, that is, with tracking, improving the quality and precision of the images.

In accordance with another aspect of the present invention, the robotized unit comprises an interception member vertically mobile between a resting position in which it is located below a movement plane of the metal product and does not interfere with the latter, and an interception position in which it is incident to the movement plane in order to temporarily stop a part of the metal product which is intended to be manipulated/cut with the robotized articulated arm. This member allows to stretch the metal product coils so as to facilitate the gripping, manipulation, possible cutting and extraction of a portion of product.

The present invention also concerns a computerized method to control a metal product in motion, preferably rod or hot-rolled wire. The method provides to acquire, by means of a video monitoring system of an acquisition and control unit, a sequence of frames of the metal product, process the sequence of frames by means of a processing system, transmit an actuation signal to a robotized articulated arm by means of a processing system, and drive the robotized articulated arm according to the actuation signal.

In accordance with one aspect of the present invention, the method provides that an artificial intelligence implemented in the processing system at least a) recognizes a tail portion of the metal product and b) identifies whether the tail portion has a macroscopic defect, for example a shape or cobble defect.

In accordance with another aspect of the present invention, according to the type of defect detected, the robotized articulated arm is moved in order to reposition the tail portion on-the-fly by means of its own gripping tool, or to cut the tail portion on-the-fly by means of its own cutting tool.

In accordance with another aspect of the present invention, the artificial intelligence comprises a recognition algorithm which identifies on each frame of the sequence of frames a first point and a second point which define between them a control strip, the width and position of which identify whether the frame is a central frame or a tail frame of the metal product, or an empty frame. A macroscopic recognition of the product along its entire length is thus achieved.

In accordance with another aspect of the present invention, the artificial intelligence comprises a convolutional neural network comprising an input level or layer which receives, on each occasion, a frame of the sequence of frames, one or more convolutional levels or layers having the function of identifying macroscopic geometric and visual characteristics of the tail portion, at least one completely connected level configured to classify the frame on the basis of the information received from a last one of the one or more convolutional levels or layers, and an output level or layer defined by a binary class vector comprising a first class and a second class, both characterized by a respective confidence index of absence of defect and presence of defect.

In accordance with another aspect of the present invention, if the confidence index relating to the second class exceeds a determinate preestablished threshold, the convolutional neural network establishes that the analyzed frame relates to a metal product with a defect, it generates a specific actuation signal which is transmitted to the robotized articulated arm for the correction of the defect.

In accordance with another aspect of the present invention, the at least one completely connected level is configured to classify the frame on the basis of the information received from a last one of the one or more convolutional levels or layers into respective classes of belonging that comprise tail frames with shape defects and tail frames with cobble defects.

The present invention also concerns an apparatus for the production of metal reels comprising:

a winding unit having a laying head and configured to receive a metal product in linear form and to conform it into coils, an automatic reel forming unit able to receive the metal product conformed in coils and to form a reel, and a roller way configured to move the metal product conformed in coils from an initial end, in correspondence with which the winding unit is disposed, to a terminal end, in correspondence with which the automatic reel forming unit is disposed, In accordance with one aspect of the present invention, the apparatus comprises a robotized unit disposed in a position comprised between the initial end and the terminal end of the roller way.

The present invention also concerns a method to produce metal reels in which:

a winding unit receives a metal product in linear form and a laying head conforms it into coils, an automatic reel forming unit receives the metal product conformed in coils and forms a reel, and a roller way moves the metal product conformed in coils from an initial end, in correspondence with which the winding unit is disposed, to a terminal end of the roller way in correspondence with which the automatic reel forming unit is disposed.

In accordance with one aspect of the present invention, the method provides that a robotized unit acts in a position comprised between the initial end and the terminal end of the roller way in order to manipulate, reposition or cut the metal product.

DESCRIPTION OF THE DRAWINGS

These and other aspects, characteristics and advantages of the present invention will become apparent from the following description of some embodiments, given as a non-restrictive example with reference to the attached drawings wherein.

Figure 1:
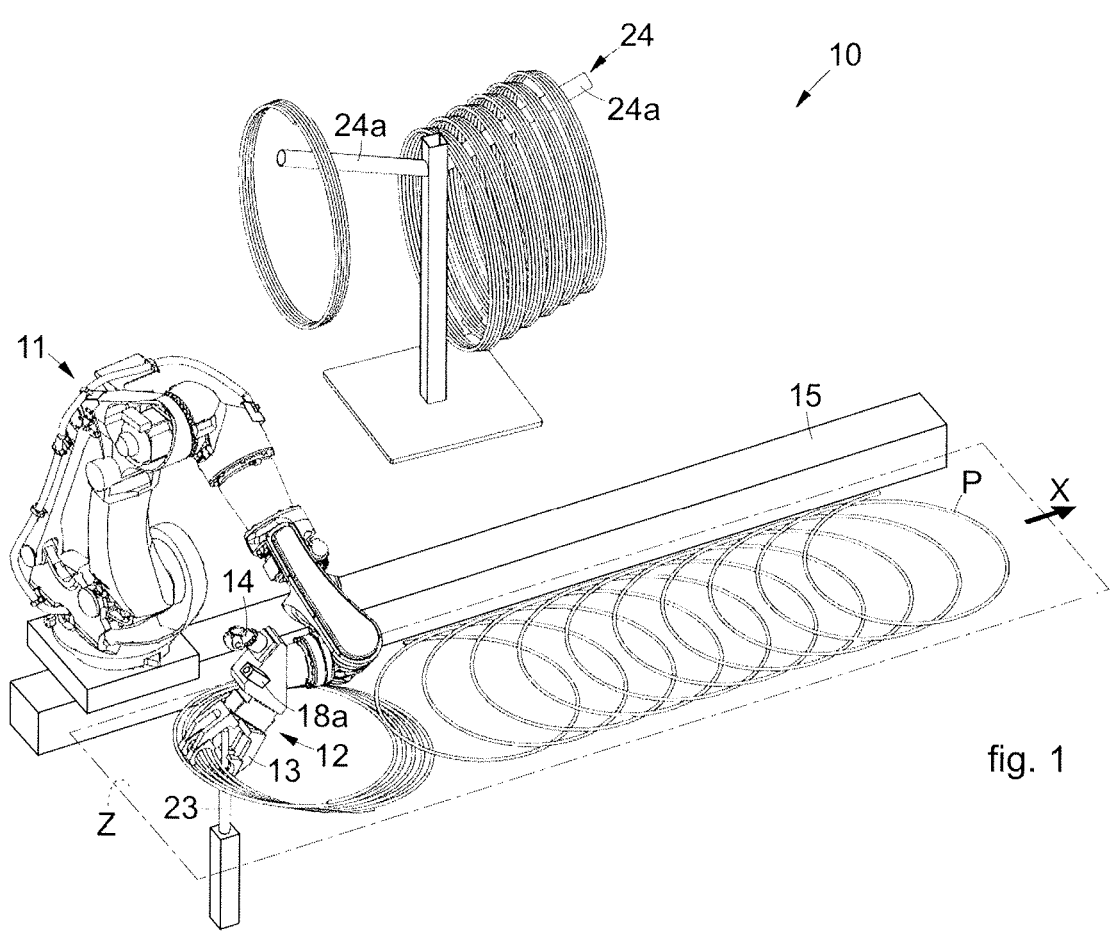
FIG. 1 is a perspective view of a robotized unit for controlling a metal product in motion, according to the present invention.

We must clarify that in the present description the phraseology and terminology used, as well as the figures in the attached drawings also as described, have the sole function of better illustrating and explaining the present invention, their function being to provide a non-limiting example of the invention itself, since the scope of protection is defined by the claims.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF AN EMBODIMENT OF THE PRESENT INVENTION

With reference to FIG. 1, this shows a robotized unit 10 according to the present invention for controlling a metal product P, which can be a smooth or ribbed rod or a metal wire, moving in a substantially linear direction of feed X.

The metal product P is disposed according to a series of coils disposed in an offset configuration in the direction of feed X by means of machines of a known type, such as a coil forming head for example.

The metal product P is moved on a movement plane Z that is substantially horizontal, but which can possibly also be inclined upward or downward, for example, in the direction of feed X.

After its movement on the movement plane Z, the metal product P can be packaged in reels or skeins 200.

The unit 10 comprises at least one robotized articulated arm 11 having a manipulation head 12 provided with a gripping tool 13 and a cutting tool 14, which are respectively configured to manipulate the metal product P and to cut it, that is, to separate a specific portion thereof.

This specific portion can be a terminal or tail portion P1 (FIG. 3) or a sample portion disposed, for example, in a position comprised between the tail portion P1 and an initial or head portion P2 of the metal product P. Between the head portion P2 and the tail portion P1 there is a central portion P3 (FIG. 3) having a homogeneous, transversely aligned and substantially planar conformation in coils.

The robotized articulated arm 11 can preferably be moved according to six degrees of freedom, and it can be moved according to an additional seventh degree of freedom. For this purpose, the robotized unit 10 can comprise for example a slider or a rail 15, on which the arm 11 is mounted sliding, which is parallel to the direction of feed X so that the arm 11 can follow the product P being worked.

The robotized unit 10 can also comprise an interception member 23 (FIG. 2) vertically mobile between a resting position in which it is located below the movement plane Z of the metal product P and does not interfere with the latter, and an interception position in which it is incident to the movement plane Z so as to hold the coils of the metal product P which are intended to be manipulated/cut by means of the robotized articulated arm 11.

The robotized unit 10 can also comprise a deposit unit 24 provided with arms 24a on which the portions of metal product P which are removed are deposited.

Figure 3:
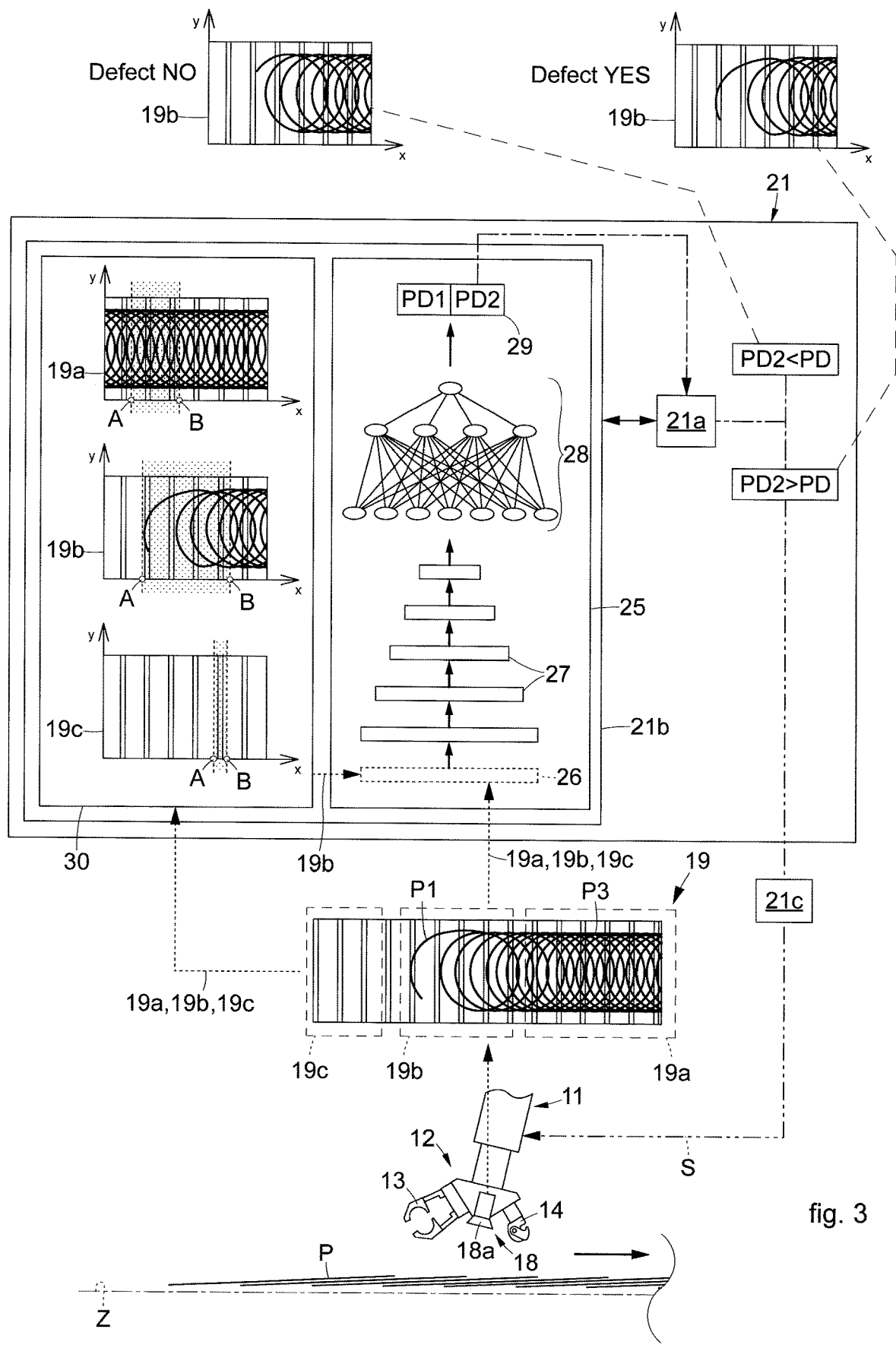
FIG. 3 is a schematic view which shows the operation of the artificial intelligence for recognizing the metal product and the defects possibly present in its tail portion.

The robotized unit 10 has an acquisition and control unit comprising a video monitoring system 18 for acquiring a video sequence and/or a sequence of digital images, or frames, in particular a sequence of frames 19 of the metal product P being worked (FIG. 3).

The sequence of frames 19 can be continuous or acquired at regular or irregular intervals.

Figure 2:
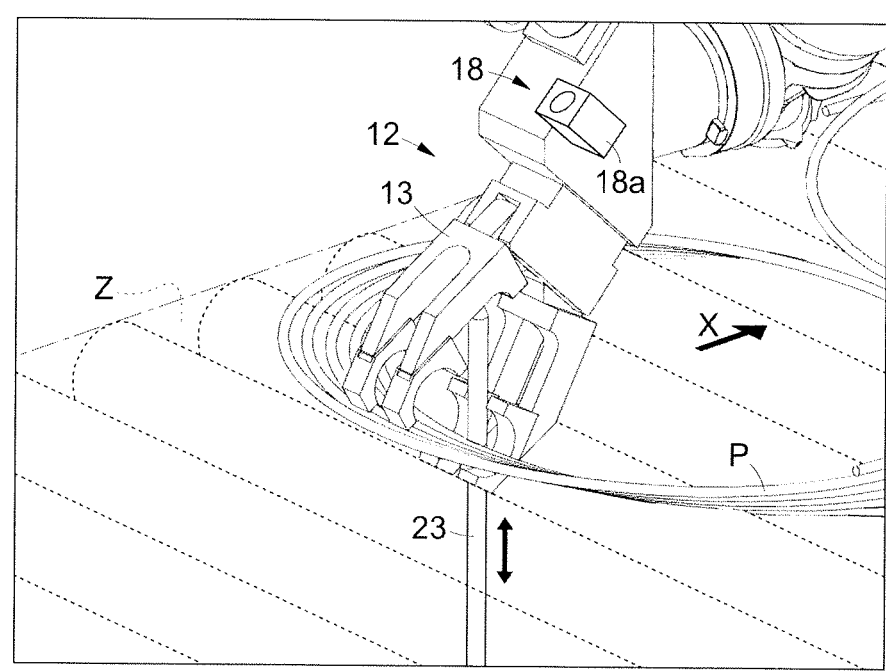
FIG. 2 is an enlarged detail in which an interception member is visible which is able to intercept the metal product in motion.

The video monitoring system 18 can comprise at least one video camera 18a preferably positioned on board the robotized articulated arm 11 (FIG. 1 and FIG. 2).

The video camera 18a can be positioned on the manipulation head 12 and be oriented according to a direction substantially perpendicular to the direction of feed X.

In this case, the sequence of frames 19 can be acquired "with tracking", both through the intrinsic mobility of the robotized articulated arm 11 and also through the translation of the arm 11 along the rail 15, if provided.

Alternatively, the video camera 18a can also be disposed in a fixed position with respect to the metal product P being worked, along or above the movement plane Z so as to guide the robotized articulated arm 11.

The acquisition and control unit also comprises a processing system 21 connected to the video monitoring system 18 (FIG. 3).

The processing system 21 is configured to process the sequence of frames 19 and transmit an actuation signal S to the arm 11 to manipulate, reposition and/or cut the tail portion P1 or a sample portion.

The processing system 21 implements an artificial intelligence configured at least to: a) recognize the terminal portion P1, b) identify whether the terminal portion P1 has a defect.

The defects in question are of the macroscopic type, that is, they do not concern microscopic surface defects, and they can be defects in shape, or geometric, or cobble defects, in which a portion of the metal product P can have a configuration that "exits" from the movement plane Z.

Therefore, the artificial intelligence is capable of identifying a specific portion of the metal product P along its length in the direction of feed X, as well as the presence of defects in its terminal portion P1.

This artificial intelligence is therefore particularly optimized, since it allows to very rapidly distinguish first a sequence of frames 19 containing the portion of interest, for example the terminal portion P1, and subsequently to recognize the presence of a possible macroscopic defect.

Compared to the solutions of the prior art, these operations have to occur almost instantaneously, since the detection of a defect is followed by the actuation of the arm 11 (manipulation, repositioning or cutting with possible subsequent repositioning) advantageously without any interruption or slowing down of the process.

Furthermore, the macroscopic analysis performed by the artificial intelligence of the present invention presupposes "global" comparisons along the entire length of the metal product P, therefore it cannot be assimilated to a microscopic surface inspection.

In possible implementations, the artificial intelligence as above can also be configured to c) classify the type of defect, for example shape or cobble defect.

In the specific case of a shape defect, the processing system 21 is configured to identify the position and geometric characteristics of the terminal portion P1 with respect to the homogeneous portion P3, for example to recognize a possible variation in position with respect to the latter.

The processing system 21 can comprise a CPU 21a and a storage module 21b which can be connected to the programmable CPU 21a and be among those commercially available, such as a random access memory (RAM), a read-only memory (ROM), floppy disc, hard disk (HARD DISK), non-volatile memory (NOR FLASH and NAND FLASH), mass memory or any other form of digital storage or electronic database whatsoever.

The storage module 21b can be able to store one or more artificial intelligence-based recognition algorithms, such as neural networks, SVMs (Support Vector Machines), neuro-fuzzy networks, genetic algorithms or suchlike.

The CPU 21a can be any type of microprocessor or processor whatsoever, and it can be able to execute the recognition algorithms as above.

In possible embodiments, in order to exploit the evolution and the level of sophistication reached by image recognition neural networks, algorithms based on the state of the art of deep convolutional networks (CNN or DCNN) designed for image classification can be stored in the storage module 21b. These architectures generally consist of one or more convolutional layers and can terminate with a module of fully connected layers. The cascaded application of convolutional layers allows to extract local features of the acquired image at different scale levels. The convolutional neural network then processes the starting image providing an alternative representation thereof. Finally, this output can be processed and used in multiple tasks, for example image classification or object recognition.

Examples of architectures of this type are EfficientNet, MobileNet, ResNet or VGG16.

In the embodiment described here, an artificial intelligence is implemented on the storage module 21b which comprises a convolutional neural network 25 comprising an input level or layer 26 which receives, on each occasion, a frame 19a, 19b, 19c of the sequence of frames 19 that the convolutional neural network 25 has to analyze, represented as a matrix of pixels.

The convolutional neural network 25 also comprises one or more convolutional levels 27 having the function of identifying visual features, such as for example curves, lines, edges, depicted in the frame 19a, 19b, 19c.

The frame 19a, 19b, 19c is then processed sequentially by the layers of the convolutional network. Each filter of the nth convolutional level 27, which can be identified as a scalar matrix containing numerical values or weights, is applied, according to a given step, to all the sectors that make up the output of the previous level, obtaining a filtered image, also known to the people of skill in the art as an activation map.

Between the nth convolutional level 27 and the nth+1 convolutional level 27 there can be a non-linear level or layer having the function of introducing a non-linearity to a system which is substantially calculating linear operations during the convolutional levels 27 After some non-linear levels there can be a so-called "pool" level or layer. Additional regularization layers can be present, such as a so-called "batch normalization" layer for example.

The possibility of composing the multiple functional components of a convolutional network allows for a vast variety of possible architectures. It is common practice to use architectures studied in the literature which have demonstrated excellent predictive capabilities in similar tasks, for example architectures of the EfficientNet type.

The convolutional neural network 25 comprises at least one fully connected level or layer 28, downstream of the convolutional layers 27, which is configured to classify the filtered image on the basis of the information received from the last previous layer. The fully connected layer 28 comprises a series of nodes trained to recognize whether the metal product P identified in the filtered image has a defect or not.

Downstream of the fully connected level 28 there is an output level 29 defined by a binary class vector comprising a first class ("defective product") and a second class ("non-defective product"), each class being characterized by a confidence index PD1 and PD2.

If the confidence index PD2 relating to the second class exceeds a determinate threshold PD, the convolutional neural network 25 establishes that the frame 19a, 19b, 19c just analyzed contains a defective metal product P, it generates a specific actuation signal S and transmits it to the robotized articulated arm 11 in order to correct the defect.

The convolutional neural network 25 is initially trained, in a manner known per se, using a "training set" containing sample images showing different configurations of the coils that characterize the metal product P. In this way, the weights of the convolutional network 25 can be suitably trained. If the convolutional network 25 replicates, even in part, an architecture known in the literature (for example ResNet, EfficientNet) it is possible to train the weights of the network starting from a configuration thereof trained on a different dataset, usually with a much larger size, according to a technique known as "transfer learning".

According to one embodiment, before sending the frames 19a, 19b, 19c to the input level 26 of the convolutional neural network 25, a recognition algorithm 30 can be preliminarily applied which has the function of identifying one or more frames 19b of the sequence of frames 19 in which a tail portion, that is, the terminal portion of the metal product P is visible.

In particular, the recognition algorithm 30 can be configured to identify, on each frame 19a, 19b, 19c of the sequence of frames 19, a first point A and a second point B which define between them a control strip, the width and position of which identify whether the frame is a central frame 19a or a tail frame 19b of the metal product P, or an empty frame 19c.

The central frames 19a are those in which the central portion P3 is visible. The trail frames 19b are those in which the terminal portion P1 is visible. The empty frames 19c are those in which the metal product P is not visible because it has already finished.

A reference system (x, y) can be associated with each frame, in which the abscissa x is parallel to the direction of feed X of the metal product P while the ordinate y is orthogonal to the direction of feed X. The points A and B are projected onto the abscissa x and define between them a control strip, identified with dashed lines in FIG. 3.

Only the tail frames 19b can be analyzed by the convolutional neural network 25. Alternatively, the convolutional neural network 25 is configured to accept any frame 19a, 19b, 19c at input and the recognition occurs directly inside it.

According to one possible embodiment, the convolutional neural network 25 can comprise an additional fully connected level configured to classify the filtered image, on the basis of the information received from the last previous level, into respective classes of belonging that comprise the tail frames 19b with shape defects and the tail frames 19b with cobble defects.

In accordance with some embodiments, both during a step of training the convolutional neural network 25, and possibly also subsequently, there is provided a validation process in which an operator notes: a) the type of frame 19a, 19b, 19c; b) the presence or absence of a defect, relative to the tail frames 19b; c) the type of defect, relative to the tail frames 19b which present a defect.

According to some embodiments, the processing system 21 can comprise an automation module 21c associated with the arm 11 and configured to receive the information processed by the convolutional neural network 25 and manage the movement of the robotized articulated arm 11 as required.

In the event that the convolutional neural network 25 has identified a defect in the metal product P being worked, the movement of the robotized articulated arm 11 can comprise a repositioning of the tail portion P1 so as to align it with the central portion P3 by means of the gripping tool 13—shape defect, or the cutting of the tail portion P1 by means of the cutting tool 14—cobble defect.

The acquisition and control unit can also be managed, in an automated or manual manner, to command a movement of the robotized articulated arm 11 in order to carry out samplings on the metal product P. In this case, the recognition algorithm 30 can be used to identify the central frames 19a which correspond to the central portion P3 along which the sample portion is taken.

Figures 4, 5:
FIGS. 4 and 5 are a top view and a lateral view, respectively, of an apparatus for producing metal reels according to the present invention.

Some embodiments described with reference to FIGS. 4-5 show an apparatus 100 for the production of metal reels 200, for example starting from a hot-rolled metal product P.

The apparatus 100 comprises a winding unit 110 having a laying head 111 and configured to receive the metal product P in linear form and to conform it into coils, and an automatic reel forming unit 113 able to receive the metal product P conformed in coils and group it into reels 200.

The apparatus 100 comprises a roller way 112, or cooling belt, on which the metal product P conformed in coils is rested. The roller way 112 has an initial end 112a, in correspondence with which the winding unit 110 is disposed, and a terminal end 112b, in correspondence with which the automatic reel forming unit 113 is disposed.

The roller way 112 defines the movement plane Z of the metal product P and can integrate cooling systems so as to bring the temperature of the metal product P from about 1000° C., at exit from the winding unit 110, to about 500° C. at the end of the roller way 112.

The apparatus 100 comprises the robotized unit 10 which is disposed in a position comprised between the initial end 112a and the terminal end 112b of the roller way 112.

The robotized unit 10 is disposed to the side of the roller way 112 so that the robotized articulated arm 11 can cooperate with the metal product P being worked.

The rail 15 of the robotized unit 10 can be disposed parallel to the roller way 112.

The interception member 23 can be configured to be inserted between the rollers of the roller way 112 in order to block the coil or coils that the robotized articulated arm 11 has to manipulate or cut.

Some embodiments also concern a method to produce metal reels 200 in which the winding unit 110 receives the metal product P in linear form and a laying head 111 conforms it into coils, the automatic reel forming unit 113 receives the metal product P in coils and forms a metal reel 200, and the roller way 112 moves the metal product P in coils from the initial end 112a to the terminal end.

The robotized unit 10 acts in a position comprised between the initial end 112a and the terminal end 112b to manipulate, reposition or cut the metal product P as previously described.

It is clear that modifications and/or additions of parts may be made to the robotized unit and method to control a metal product in motion, and to the apparatus and method to produce metal reels as described heretofore, without departing from the field and scope of the present invention.

It is also clear that, although the present invention has been described with reference to some specific examples, a person of skill in the art shall certainly be able to achieve many other equivalent forms of a robotized unit and method to control a metal product in motion, and of an apparatus and method to produce metal reels, having the characteristics as set forth in the claims and hence all coming within the field of protection defined thereby.

In the following claims, the sole purpose of the references in brackets is to facilitate their reading and they must not be considered as restrictive factors with regard to the field of protection defined by the same claims.

The invention claimed is:

1. Computerized method to control a metal product in motion, comprising:

acquiring, by a video monitoring system of an acquisition and control unit, a sequence of frames of said metal product which are processed by a processing system, and transmitting an actuation signal to a robotized articulated arm driving it according to said actuation signal, wherein an artificial intelligence implemented in said processing system at least:

a) recognizes a tail portion of said metal product; and b) identifies whether said tail portion has a macroscopic defect, wherein according to the type of defect detected, moving said robotized articulated arm in order to reposition said tail portion on-the-fly by means of its own gripping tool, or to cut said tail portion on-the-fly by means of its own cutting tool.

2. Method as in claim 1, wherein said artificial intelligence comprises a recognition algorithm which identifies on each frame of said sequence of frames a first point and a second point which define between them a control strip, the width and position of which identify whether said frame is a central frame or a tail frame of said metal product, or an empty frame.

3. Method as in claim 1, wherein said artificial intelligence comprises a convolutional neural network comprising an input level or layer which receives, on each occasion, a frame of said sequence of frames, one or more convolutional levels or layers having the function of identifying macroscopic geometric and visual characteristics of said tail portion, at least one completely connected level configured to classify said frame on the basis of the information received from a last one of said one or more convolutional levels or layers, and an output level or layer defined by a binary class vector comprising a first class and a second class, both classes characterized by a respective confidence index of absence of defect and presence of defect.

4. Method as in claim 3, wherein if the confidence index relating to said second class exceeds a determinate preestablished threshold, the convolutional neural network establishes that said analyzed frame relates to a metal product with a defect, it generates a specific actuation signal which is transmitted to said robotized articulated arm for the correction of the defect.

5. Method as in claim 3, wherein said at least one completely connected level is configured to classify said frame on the basis of the information received from a last one of said one or more convolutional levels or layers into respective classes of belonging that comprise tail frames with shape defects and tail frames with cobble defects.

6. Robotized unit for controlling a metal product in motion, comprising:

at least one robotized articulated arm and an acquisition and control unit comprising a video monitoring system and a processing system configured to acquire and process a sequence of frames of said metal product and transmit an actuation signal to said robotized articulated arm in order to manipulate or cut a portion of said metal product, wherein said processing system implements an artificial intelligence configured at least to:

a) recognize a terminal portion of said metal product; and b) identify whether said terminal portion has a macroscopic defect, said processing system being configured to selectively manage movements of said robotized articulated arm on the basis of the defect identified.

7. Robotized unit as in claim 6, wherein said robotized articulated arm can be moved in at least six degrees of freedom.

8. Robotized unit as in claim 6, wherein said video monitoring system comprises at least one video camera positioned on a manipulation head of said robotized articulated arm.

9. Robotized unit as in claim 6, wherein said video monitoring system comprises at least one video camera positioned on a fixed support.

10. Robotized unit as in claim 6, further comprising an interception member vertically mobile between a resting position in which it is located below a movement plane of said metal product without interfering with the latter, and an interception position in which it is incident to said movement plane in order to temporarily stop a part of said metal product which is intended to be manipulated/cut with said arm.

11. Method to produce metal in which comprising:

receiving, by a winding unit, a metal product in linear form and a laying head conforms it into coils, forming, by an automatic reel forming unit, said metal product in coils and forms a reel, and moving, by a roller way, said metal product in coils from an initial end, in correspondence with which said winding unit is disposed, to a terminal end, in correspondence with which said automatic reel forming unit is disposed, wherein the robotized unit, as in claim 1, is moved laterally into a position between said initial end and said terminal end of said roller way in order to manipulate, reposition or cut said metal product.

12. Apparatus for the production of metal reels comprising:

a winding unit having a laying head and configured to receive a metal product in linear form and to conform it into coils, an automatic reel forming unit able to receive said metal product conformed in coils and to form a reel, a roller way configured to move said metal product conformed in coils from an initial end in correspondence with which said winding unit is disposed, to a terminal end in correspondence with which said automatic reel forming unit is disposed, and the robotized unit, as in claim 1, disposed in a position comprised between said initial end and said terminal end of said roller way.

\* \* \* \* \*